Figure 1:
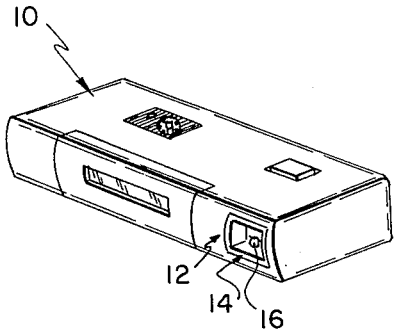
Figure 3A:
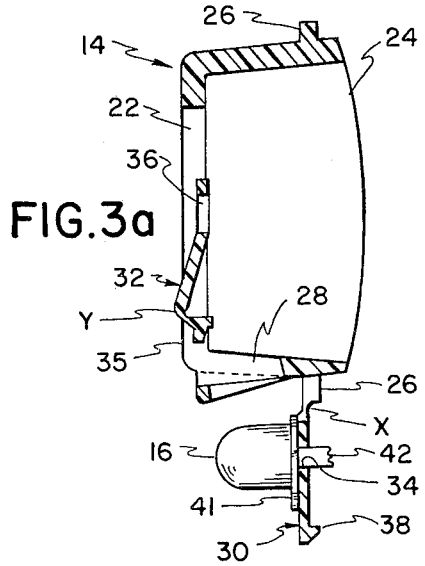
Figure 2:
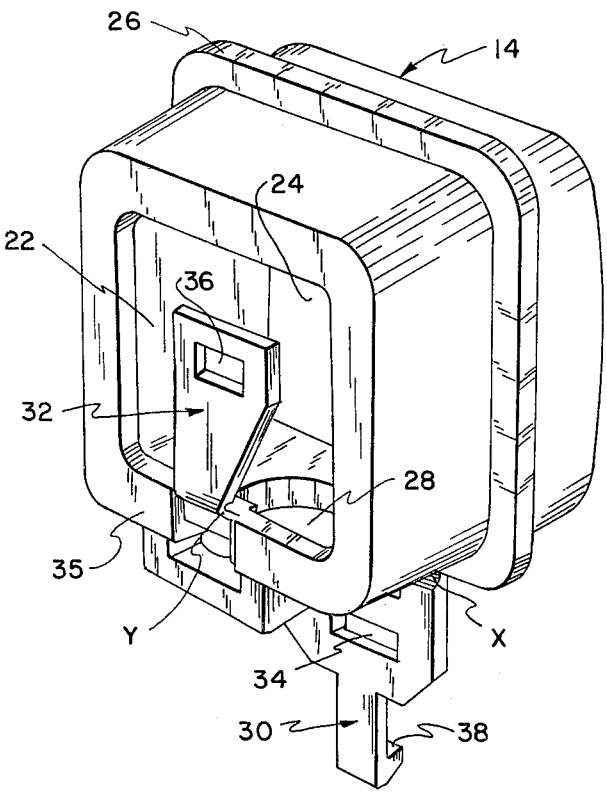
Figure 3B:
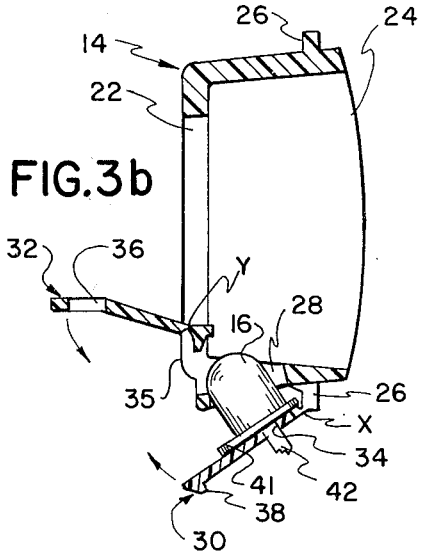
Figure 3C:
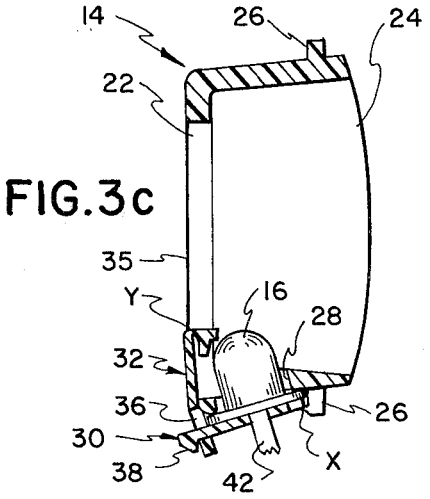

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 8

T946,004
CAMERA VIEWFINDER WITH INDICATOR
David A. Siefer, 39 Maple Hill Farm Road,
Penfield, N.Y. 14526
Filed Mar. 19, 1975, Ser. No. 559,960
Int. Cl. G03b *17/20*
U.S. Cl. 354—53
1 Sheet Drawing. 6 Pages Specification

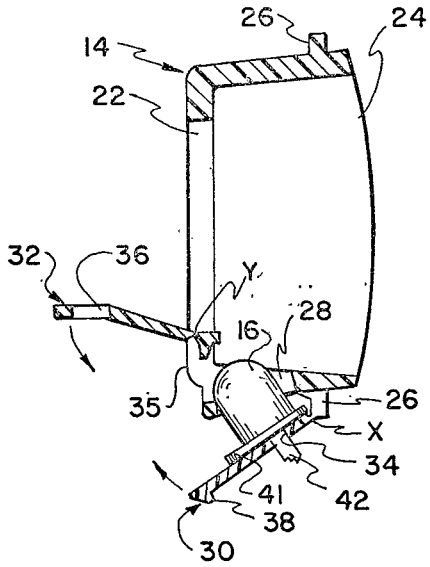

A camera warning indicator is positioned and secured at the entrance of a viewfinder housing by cooperating positioning and securing members of the viewfinder housing. The positioning and securing members are integral with the viewfinder such that the indicator is positioned by one member to be viewable through the viewfinder housing, while the other member is foldable to lock the first member in position to secure the indicator within the viewfinder housing.

CAMERA VIEWFINDER WITH INDICATOR

Original Filed March 19, 1975